United States Patent [19]

Garfinkle

[11] Patent Number: 4,615,503
[45] Date of Patent: Oct. 7, 1986

[54] DELI PEGBAR APPARATUS

[75] Inventor: Benjamin L. Garfinkle, Alameda, Calif.

[73] Assignee: Clamp Swing Pricing Co., Alameda, Calif.

[21] Appl. No.: 730,662

[22] Filed: May 2, 1985

[51] Int. Cl.⁴ .............................................. F16L 3/08
[52] U.S. Cl. .............................. 248/224.4; 248/220.3; 403/243; 403/254
[58] Field of Search ............... 248/224.4, 220.3, 220.4, 248/221.1, 221.2, 221.4, 222.2, 223.4; 40/16, 16.4, 16.2, 19.5; 211/59.1, 56.1, 106, 103; 403/243, 254

[56] References Cited

U.S. PATENT DOCUMENTS

| 1,306,297 | 6/1919 | Auerochs | 211/57 |
| 2,802,576 | 6/1955 | Kelling | 211/59.1 |
| 2,895,241 | 7/1959 | Ferdinand et al. | 40/16.4 X |
| 3,089,269 | 5/1963 | McKiernan | 248/221.4 X |
| 3,486,632 | 12/1969 | Balch | 211/57 |
| 3,495,717 | 2/1970 | Lavin et al. | 248/220.3 X |
| 3,610,425 | 10/1971 | Madey | 211/57 |
| 3,976,201 | 8/1976 | Hodgson et al. | 211/59 |
| 3,986,613 | 10/1976 | Mayer | 211/57 |
| 4,007,841 | 2/1977 | Seipel | 211/59 |
| 4,179,138 | 12/1979 | Bogdanovic | 40/16.4 |
| 4,319,731 | 3/1982 | Pfeifer | 248/223.4 |
| 4,474,351 | 10/1984 | Thalenfeld | 248/220.4 |
| 4,520,978 | 6/1985 | Taub | 248/220.4 |

Primary Examiner—Ramon O. Ramirez
Attorney, Agent, or Firm—Malcolm B. Wittenberg

[57] ABSTRACT

An article support and display device for use with gondola shelf uprights which is capable of converting the shelf uprights into a pegbar support. The device includes an elongated pegbar having a longitudinal dimension approximately equal to the spacing between the gondola shelf uprights themselves, two support brackets for supporting the elongated bar which is capable of engaging slots within the gondola shelf uprights and support pegs removably insertable within the elongated pegbar.

11 Claims, 4 Drawing Figures

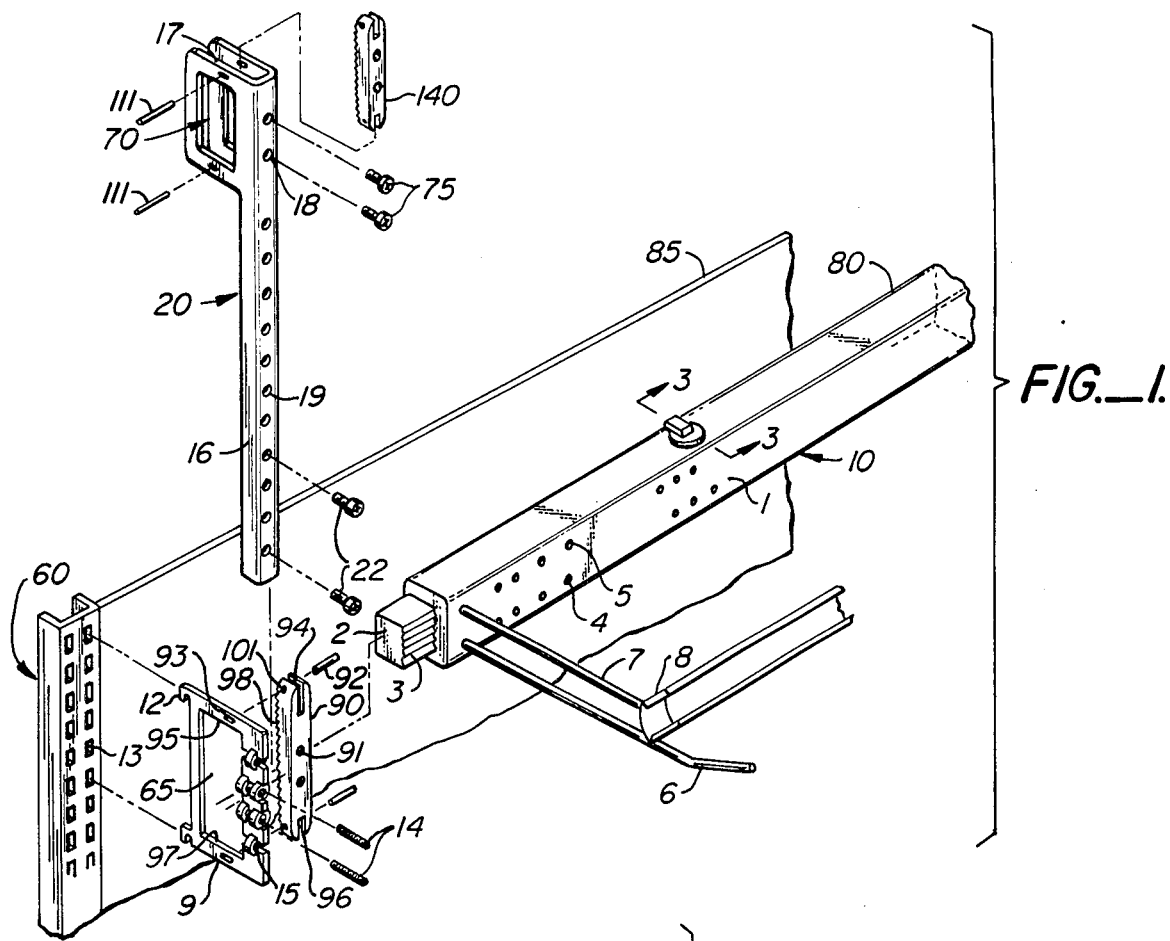
FIG._1.
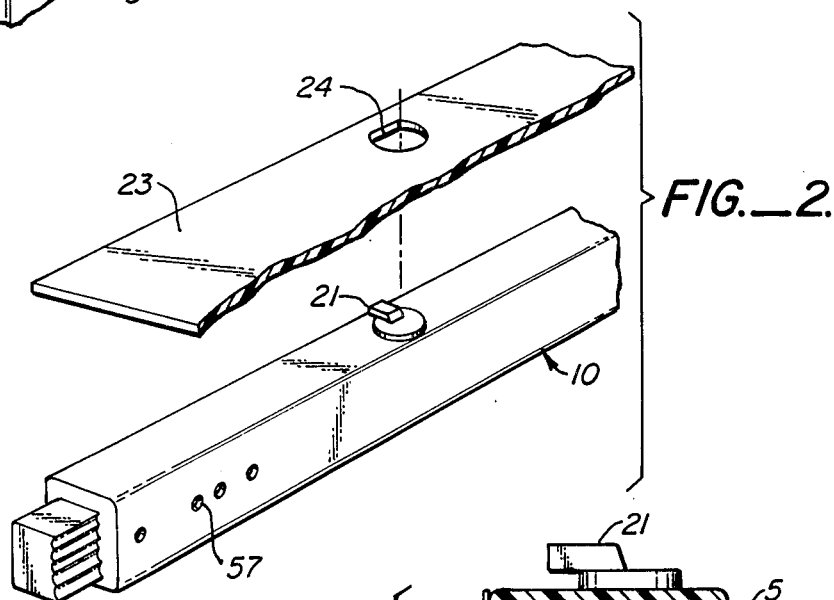
FIG._2.
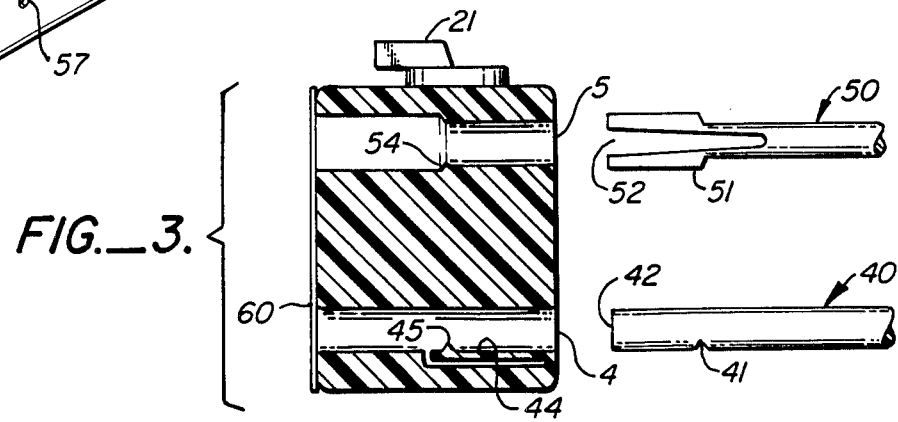
FIG._3.

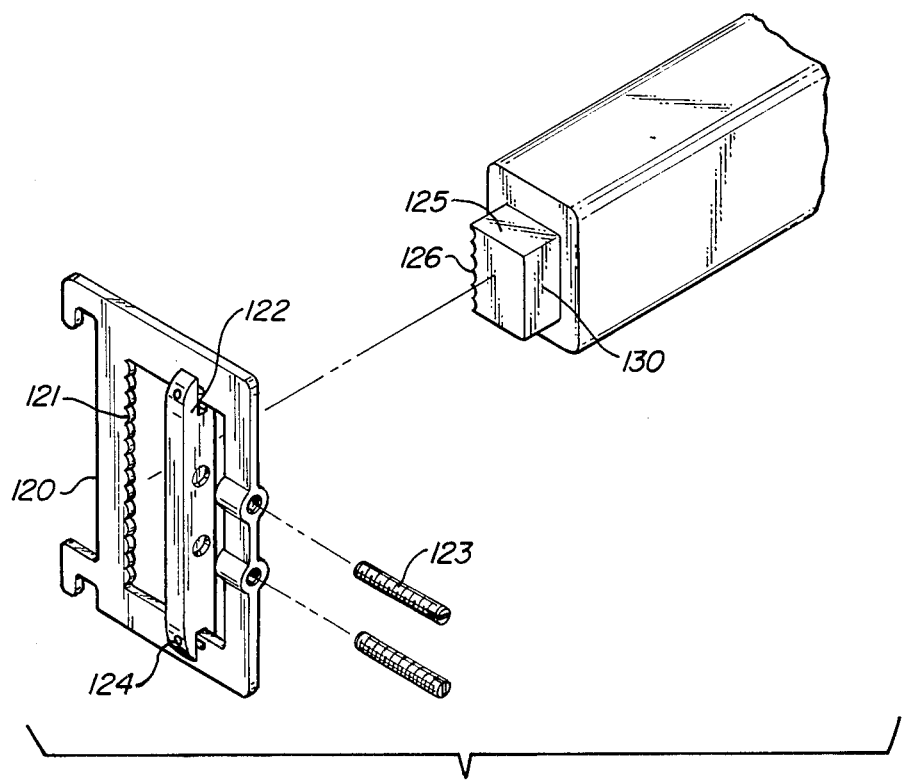
FIG._4.

DELI PEGBAR APPARATUS

DESCRIPTION

1. Technical Field of Invention

The present invention deals with a device which is capable of converting a standard gondola shelf fixture into a pegbar display. The apparatus is particularly useful in, for example, refrigerated display cases where a number of products are displayed together with pricing and other product information for ready access to consumers.

2. Background of the Invention

The invention relates to an article support and display apparatus for supporting articles of merchandise in display racks or cases and the like. Such displays are utilized in grocery stores and supermarkets and typically include a base support member or panel having apertures therein in which are inserted hanger rods for suspending articles of manufacture. Pre-existing display supports found in refrigerated cases and the like are often times vertical uprights for engaging various shelf brackets. As such, the vertical members have been generally referred to as gondola shelf uprights and are of a standard configuration being generally U-shaped in cross-section having two rows of vertically oriented slots for engagement with corresponding hook-like protrusions emanating from variously configured shelf support members.

Although it is often times advantageous to provide shelves in a refrigerated supermarket display case, it is equally advantageous to provide other types of article display and support means such as display racks of a type having forwardly projecting article supporting rods. It is further advantageous to locate proximate to said supporting rods pricing and informational tags which display consumer information of a type common to virtually all supermarket installations. Such display racks of a type having forwardly projecting article support rods are known, which are adapted to be mounted on a vertical shelf upright or support plate for use in open-front refrigerated display cases. For example, display racks of this type are disclosed in U.S. Pat. No. 3,486,632. Commonly employed is one set of supporting rods for the merchandise to be sold. To display pricing informational tags a rack must be supplied with a special set of support rods to support the molding to display said tags associated with the merchandise. Prior to the present invention, there has not been an available means of configuring such display racks in display cases processing gondola shelf uprights without the need for rather elaborate bolt-on angle-iron support structures and similar configurations requiring a substantial expenditure in labor and hardware.

It is thus an object of the present invention to provide an article support and display device for use with gondola shelf uprights while eliminating the disadvantages recited above.

It is yet another object of the present invention to provide an article support and display device for use with gondola shelf uprights which is capable of quick assembly/ disassembly while employing the shelf uprights themselves as a principal support means for the display.

These and further objects of this invention will be more readily perceived when considering the following disclosure and appended drawings wherein:

FIG. 1 is an exploded perspective view of the component parts of the present invention.

FIG. 2 is an exploded perspective view of a second embodiment of the present invention.

FIG. 3 is a cross-sectional view taken along line 3—3 of FIG. 1.

FIG. 4 is yet another exploded perspective view of a further embodiment of the present invention.

SUMMARY OF THE INVENTION

The present invention deals with an article support and display device for use with gondola shelf fixtures. The support and display device comprises an elongated pegbar having a longitudinal dimension approximately equal to the spacing between the gondola shelf uprights being used to support said pegbar. The elongated pegbar is further characterized as comprising a central section having holes configured therein for accepting support pegs and having two support regions at the extremities of the elongated pegbar for insertion within support brackets used for the supporting and retaining of said elongated pegbar. The support brackets are characterized as possessing one or more hook means for engaging corresponding slots in the gondola shelf fixtures and an orifice for accepting a support end of the elongated pegbar. One or more screws are provided with threaded holes in the support brackets for securing the elongated pegbar in place in engagement with the support brackets. Lastly, support pegs are removably insertable within either one or two rows of holes located in the central section of the elongated pegbar to act as merchandise support pegs and pegs for supporting molding which displays various pricing and informational tags.

As a further embodiment, the present invention contemplates the use of an extension means for raising the elongated pegbar above the slots of a gondola shelf fixture or below an existing shelf. As yet another embodiment, means are provided for releasably securing baffle means along the top surface of the elongated pegbar as an energy saving means.

DETAILED DESCRIPTION OF THE INVENTION

Turning to FIGS. 1 and 2, elongated pegbar 10 is shown in section whereby two parallel rows of holes 4 and 5 or alternatively a single row of holes 57 (FIG. 2) are depicted in a rather regular pattern. Ideally, one or more of the holes is intended to receive merchandise support rods 6 and molding support rod 7 (FIG. 1) which, in turn, is intended to engage molding 8 which contains pricing and informational tags. As a preferred embodiment, each of the holes are sequentially numbered so that the user of this invention can readily locate the proper hole for insertion of various rods 6 and 7 so that the merchandise display can be most advantageously set up. At the extremities of elongated pegbar 10 are support regions, the left hand region being depicted in FIG. 1 as element 2. Support region 2 is configured to be insertable within support bracket 9 which, in turn, is intended to engage gondola upright 60 via parallel vertically extending slots 13. Once inserted through threaded holes 15, set screws 14 are driven to engage the forward face of indented pressure bar 90 which in turn engages support end 2.

As a preferred embodiment, also insertable within support bracket 9 is indented pressure bar 90. In practice, pressure bar 90 is indented to fit within orifice 65 so that slots 94 and 96 embrace bracket 9 at 96 and 97, respectively. Once in place, set pegs 92 are caused to pass through openings 101 in the indented pressure bar and aligned openings 93 in bracket 9 to secure the bar in place. When this is accomplished, set screws 14 will pass through threaded openings 15, and abut openings 91 to push the pressure bar against the forward face of support end 2.

As a further preferred embodiment, support end 2 is configured with regularly spaced indents 3, the apex of which are preferably ¼ inch apart. It is readily perceived that the horizontal orientation of elongated pegbar 10 can be modified or "fine-tuned" by simply loosening set screws 14 and moving support region 2 up or down within orifice 65 so that indents 98 can engage different indents 3. It is further to be noted that the present invention provides an exceedingly rigid article support and display device for as screws 14 are sunk within holes 15, hooks 12 are firmly pulled against the back surface of U-shaped gondola shelf fixture 60, and back surface 80 of peg bar 10 is pulled against front panel 85, thus preventing inadvertent displacement of support bracket 9 without first loosening set screws 14.

This same "fine tuning" can be accomplished by employing the structure depicted in FIG. 4. In this embodiment, bracket 120 is shown with teeth which are engageable with indents 126 located on the rear face of support region 125. Pressure bar 122, shown as being held in position by pins 124 is no longer provided with indents or teeth as its sole function is to merely apply pressure to front face 130 of support region 125 in response to the application of screws 123.

As a further preferred embodiment, it is contemplated that support region 2 be configured as possessing a smaller cross-sectional area than that of central section 1. As such, and by properly sizing orifice 65 to be larger than the cross-sectional area of support region 2, but smaller than the cross-sectional area of central region 1, a natural backstop is provided to control the longitudinal length of insertion within support bracket 9.

In practicing the present invention, it has been recognized that it is often times desirable to position elongated pegbar 10 and various support pegs emanating therefrom above slots in previously existing gondola shelf fixture 60 or below a pre-existing shelf. In accomplishing such a function, extension means 20 is provided which comprises extended leg portion 16 which is located in front of the body of support bracket 9 and engageable there with via set screws 22 which pass through openings 19 and threaded openings 15. Coincident to extended leg 16 is support region 17 possessing orifice 70 for accepting support region 2 therein. In operation, extended leg 16 contacts support bracket 9 until the desired height of the elongated pegbar is reached. Thereupon, threaded holes 15 and unthreaded holes 19 are aligned and set screws 22 sunk to engage and secure extension means 20 into position. Support region 2 is then inserted through orifice 70 and set screws 75 caused to pass through threaded holes 18 for securing the elongated pegbar in position. As in the previously recited embodiments, the set screws can apply pressure to an indented pressure bar 140 held in position by pegs 111 and which in turn can engage indents 3 for vertically positioning elongated pegbar 10 within orifice 70 so that the horizontal displacement of the elongated pegbar can be fine tuned.

Turning to FIG. 2, yet a further embodiment of the present invention is depicted. In this instance, baffle 23 is shown releasably engageable with the elongated pegbar 10 via releasable securing means 21. Baffle 23 is nothing more than a shelf which can be employed as an energy saving device to aid in directing air flow within and about a refrigerated supermarket display case to enhance cooling. It is particularly interesting to note that through use of the present invention, a shelf or baffle means 23 can be employed with the elongated pegbar 10 through releasable securing means 21 while still enabling the user of this invention to employ one or more merchandise and molding support pegs.

There are various means in which the above-referenced merchandise and molding support pegs can be releasably retained within holes 4, 5, etc. As exemplifying two preferred approaches to peg design, reference is made to FIG. 3, which includes a cross-sectional view at 3/3 of FIG. 1, shown as including holes 4 and 5 as receiving ports for peg ends 40 and 50.

Turning first to peg end 40, notch 41 has been formed as shown for releasable engagement with protrusion 45 on leg 44 located within hole 4. Upon insertion, deflection is caused at protrusion 45 and continued passage of peg end 40 within hole 4 results in an ultimate engagement of protrusion 45 within notch 41. The frictional/notch engagement is sufficient to prevent inadvertent removal of the support peg, although a modest outward pull of the support peg deflects protrusion 45 sufficient to disengage protrusion 45 from notch 41, thus enabling removal of the peg.

Peg end 50 operates in a different manner to that disclosed above. In this instance, lug 52 has been provided within peg end 50 to enhance radial displacement upon insertion of the lug within hole 5. One or both legs of the lug are provided with thickened region 51 which, upon insertion of support peg end 50, is caused to engage shelf 54 which substantially prevents inadvertent removal of the support peg.

In either support peg configuration, it is contemplated that the cross-section of the pegbar itself can be other than circular. As such, inadvertent rotation of the support peg is substantially eliminated.

For purposes of illustration, certain structural details envisioned by the present invention have been disclosed herein, it should be understood that said invention is limited only by the scope of the appended claims.

I claim:

1. An article support and display device for use with gondola shelf fixtures comprising:
  A. an elongated pegbar having a longitudinal dimension approximately equal to the spacing between the gondola shelf fixtures being used to support said pegbar and being further characterized as comprising a central section having holes configured therein for accepting support pegs and having two support regions at the extremities of the elongated pegbar for insertion within support brackets used for supporting and retaining said elongated pegbar, said support regions being further characterized in that the face of each support region is provided with a pattern of regularly spaced indents;
  B. two support brackets for supporting said elongated pegbar, each support bracket characterized as possessing one or more hook means for engaging corresponding slots in said gondola shelf fixtures, an orifice for accepting a support end of said elongated pegbar and one or more screws with threaded holes in the support brackets for securing the elongated pegbar in place in engagement with the support brackets by causing said hook means to be firmly pulled against a back surface of the gondola shelf fixtures; and C. support pegs removably insertable within the central section of said elongated pegbar.

2. The article support and display device of claim 1 further comprising indented pressure bars located within said orifices of said support brackets such that indents located on said indented pressure bars contact said indents located on said support regions.

3. The article support and display device in claim 1 wherein said support brackets are each provided with a toothed region for engagement with said indents located on said support regions when a pressure bar located within each orifice of the support brackets is caused to press against said support regions.

4. An article support and display device for use with gondola shelf fixtures comprising:

A. an elongated pegbar having a longitudinal dimension approximately equal to the spacing between the gondola shelf fixtures being used to support said pegbar and being further characterized as comprising a central section having holes configured therein for accepting support pegs and having two support regions at the extremities of the elongated pegbar for insertion within support brackets used for supporting and retaining said elongated pegbar;

B. two support brackets for supporting said elongated pegbar, each support bracket characterized as possessing one or more hook means for engaging corresponding slots in said gondola shelf fixtures, an orifice for accepting a support end of said elongated pegbar and one or more screws with threaded holes in the support brackets for securing the elongated pegbar in place in engagement with the support brackets by causing said hook means to be firmly pulled against a back surface of the gondola shelf fixtures;

C. support pegs removably insertable within the central section of said elongated pegbar; and D. extension means for raising the elongated pegbar above the slots in the gondola shelf fixtures.

5. The article support and display device of claim 4 wherein said extension means comprises an extended leg region attached to the body of said support bracket and a support region for accepting and supporting the support regions of said elongated pegbar.

6. The article support and display device of claim 5 wherein said extended leg region possesses a number of spaced holes for engagement with said screws which pass through said extension means and screw into the support bracket.

7. The article support and display device of claim 6 further comprising one or more screws with threaded holes in the support region of said extension means for securing the elongated pegbar in engagement with the extension means.

8. An article support and display device for use with gondola shelf fixtures comprising:

A. an elongated pegbar having a longitudinal dimension approximately equal to the spacing between the gondola shelf fixtures being used to support said pegbar and being further characterized as comprising a central section having holes configured therein for accepting support pegs and having two support regions at the extremities of the elongated pegbar for insertion within support brackets used for supporting and retaining said elongated pegbar;

B. two support brackets for supporting said elongated pegbar, each support bracket characterized as possessing one or more hook means for engaging corresponding slots in said gondola shelf fixtures, an orifice for accepting a support end of said elongated pegbar and one or more screws with threaded holes in the support brackets for securing the elongated pegbar in place in engagement with the support brackets by causing said hook means to be firmly pulled against a back surface of the gondola shelf fixtures;

C. support pegs removably insertable within the central section of said elongated pegbar; and D. means for releasably securing baffle means in said elongated pegbar.

9. An article support and display device for use with gondola shelf fixtures comprising:

A. An elongated pegbar having a longitudinal dimension approximately equal to the spacing between the gondola shelf fixtures being used to support said pegbar and being further characterized as comprising a central section having holes configured therein for accepting support pegs and having two support regions at the extremities of the elongated pegbar for insertion within support brackets used for supporting and retaining said elongated pegbar and wherein said support regions possess smaller cross-sectional areas than said central section and whose faces which are provided with a pattern of regularly spaced indents;

B. two support brackets for supporting said elongated pegbar, each support bracket characterized as possessing one or more hook means for engaging corresponding slots in said gondola shelf fixtures, an orifice for accepting a support end of said elongated pegbar and one or more screws with threaded holes in the support brackets for securing the elongated pegbar in place in engagement with the support brackets by causing said hook means to be firmly pulled against a back surface of the gondola shelf fixtures;

C. a pressure bar located within each orifice of said support brackets such that when said set screws contact said pressure bar, it is caused to contact said support regions; and D. support pegs removably insertable within the central section of said elongated pegbar.

10. The article support and display device of claim 9 wherein each of said pressure bars is indented for contact with indents located upon each of said support regions.

11. The article support and display device of claim 9 wherein said support brackets are each provided with a toothed region for engagement with indents located on said support regions when said pressure bar is caused to press against said support regions.

* * * * *